United States Patent
Martin

(10) Patent No.: US 11,649,122 B2
(45) Date of Patent: May 16, 2023

(54) GRAVITY GRAIN SPREADER

(71) Applicant: Gerald N. Martin, Dayton, VA (US)

(72) Inventor: Gerald N. Martin, Dayton, VA (US)

(*) Notice: Subject to any disclaimer, the term of this patent is extended or adjusted under 35 U.S.C. 154(b) by 0 days.

(21) Appl. No.: 17/067,687

(22) Filed: Oct. 10, 2020

(65) Prior Publication Data

US 2021/0107752 A1    Apr. 15, 2021

Related U.S. Application Data

(60) Provisional application No. 62/914,127, filed on Oct. 11, 2019.

(51) Int. Cl.
    *B65G 69/04* (2006.01)

(52) U.S. Cl.
    CPC ..... *B65G 69/0441* (2013.01); *B65G 69/0458* (2013.01)

(58) Field of Classification Search
    CPC ................ B65G 69/0441; B65G 69/0458
    USPC .................................... 414/299, 301
    See application file for complete search history.

(56) References Cited

U.S. PATENT DOCUMENTS

| | | | |
|---|---|---|---|
| 4,040,529 A * | 8/1977 | Wurdeman | B65G 69/0441 193/17 |
| 4,216,914 A * | 8/1980 | O'Hanlon | B65G 69/0458 406/162 |
| 4,342,532 A * | 8/1982 | Voegele | B65G 69/0441 193/2 R |
| 4,611,965 A | 9/1986 | Dixon | |
| 5,020,701 A | 6/1991 | Donelson | |
| 5,372,467 A * | 12/1994 | Harris | B65G 69/0458 239/681 |
| 5,403,141 A | 4/1995 | Rauser | |
| 5,755,837 A * | 5/1998 | Beierle | C10B 53/02 414/205 |
| 5,950,694 A * | 9/1999 | Jama | B01J 8/02 141/285 |
| 6,923,389 B2 | 8/2005 | Shivvers | |
| 7,931,432 B2 | 4/2011 | Hershberger | |
| 7,946,796 B2 | 5/2011 | Holland | |
| 8,708,632 B2 | 4/2014 | Toline | |
| 10,894,677 B2 * | 1/2021 | Honeck | B65G 65/32 |

FOREIGN PATENT DOCUMENTS

JP    59036033 A * 2/1984 ......... B65G 69/0458

\* cited by examiner

*Primary Examiner* — James Keenan
(74) *Attorney, Agent, or Firm* — Miller Law Group, PLLC

(57) ABSTRACT

A grain spreader apparatus is powered in rotation by the flow of grain through the grain spreader apparatus. The gravity grain spreader includes a distribution hopper mounted at the top of a grain storage bin to receive a supply of grain to be distributed within the grain storage bin in a uniform manner. The distribution hopper delivers the grain into a pair of opposingly oriented chutes meeting at an apex underneath the distribution hopper. Each chute is provided with a terminal deflector at the end of the chute, and with intermediate deflectors built into the sides of the chutes to provide a more uniform dispersal of the grain into the grain storage bin. The angle of repose of the chutes is variable through an adjustment mechanism so that higher moisture grains can be fed through the grains spreader apparatus and effectively distributed.

14 Claims, 5 Drawing Sheets

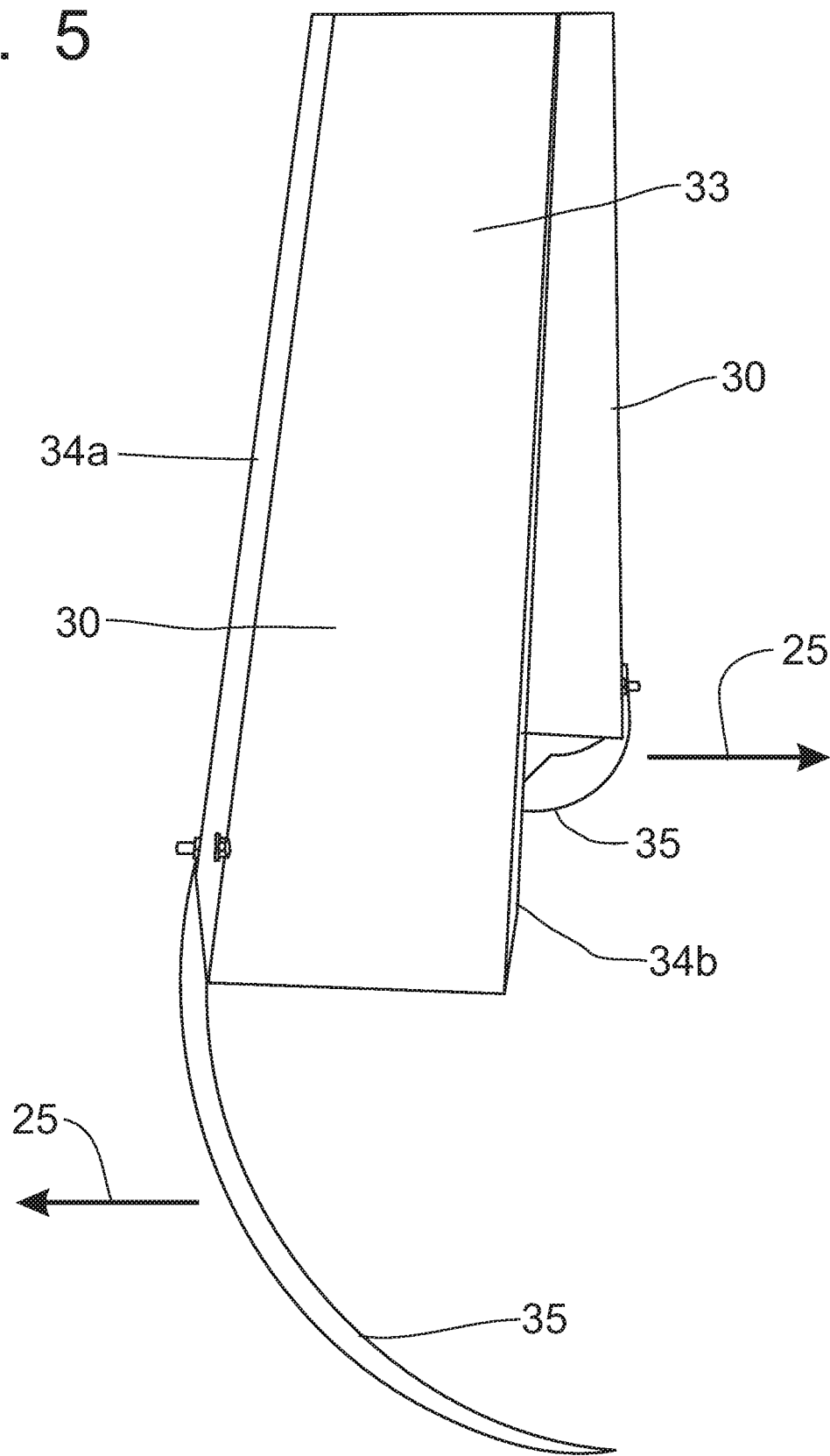

GRAVITY GRAIN SPREADER

CROSS-REFERENCE TO RELATED APPLICATIONS

This application claims domestic priority on U. S. Provisional Patent Application Ser. No. 62/914,127, filed on Oct. 11, 2019, the content of which is incorporated herein by reference.

FIELD OF THE INVENTION

This invention relates to a device for spreading corn or other grains within a storage bin and, more particularly, to a gravity powered grain spreader that distributes the grain, such as corn, evenly across the diameter of the storage bin.

BACKGROUND OF THE INVENTION

Grain spreaders are mounted at the top portion of a grain storage bin or silo to receive a supply of grain from a transport auger delivering the grain into the top of the storage bin. Grain storage bins are many feet in height and are typically used to dry the grain after the grain storage bin has been loaded by blowing air upwardly through the stored grain. Accordingly, it is preferable to load the grain uniformly within the grain storage bin as air moves to the place of least resistance. If one section of the grain stored within the grain storage bin has a disproportionate amount of fines, the flow of drying air may not move uniformly throughout the stored grain. Accordingly, grain spreaders have been developed to promote an even spreading of the grain throughout the grain storage bin. Grain spreaders can be classified into at least three different types, including static spreaders, motorized spreaders, and gravity rotation spreaders.

Static spreaders typically have a plurality of chutes extending radially from a central hopper that receives the inflow of grain from outside the grain storage bin. One such static grain spreader is disclosed in U.S. Pat. No. 4,611,965, granted to Carl R. Dixon, et al, on Sep. 16, 1986, in which a primary hopper initially receives the inflow of grain from a transport auger and funnels the flow of grain into a distribution hopper from which a plurality of chutes, in this case six radially projecting chutes were preferred, to divert the flow of grain outwardly toward the outer walls of the grain storage bin. The distribution hopper is also formed as a funnel that opens downwardly to distribute a flow of grain into the center of the grain storage bin.

A similar static grain spreader is found in U.S. Pat. No. 7,946,796. Granted to Bruce R. Holland, et al, on May 24, 2011, in which the number of radially extending distribution chutes is preferred to be sixteen, divided into eight longer and far reaching chutes to deliver grain toward the outer walls of the grain storage bin and eight shorter chutes that terminate to deliver grain closer to the center of the grain storage bin. This distribution hopper from which the sixteen chutes extend also has an open floor having an adjustable gap through which grain will fall to the center portion of the grain storage bin.

Some grain spreaders are motorized and rotate according to the rate of speed of the motor inducing the rotational movement of the grain spreader. One such motorized grain spreader can be found in U.S. Pat. No. 5,020,701, granted on Jun. 4, 1991, to Harlan J. Donelson. In this Donelson grain spreader, the funneling distribution hopper receives the inflow of grain from the transport auger and delivers the grain to a horizontal plate from which a pair of opposing chutes extends outwardly. Each of the chutes has a single vertical sidewall that directs the grain downwardly to the end of the chute where the sidewall sprays the grain outwardly due to the rotation of the horizontal plate and opposing chutes induced by a motor housed within the distribution hopper. The Donelson grain spreader discloses a pivotal mounting of the opposing chutes to the horizontal plate to permit a change in grain distribution characteristics. Furthermore, the horizontal plate is mounted in a manner to be vertically movable to change the flow characteristics from the funneling distribution hopper.

In U.S. Pat. No. 5,403,141, granted on Apr. 4, 1995, to Kenneth Rauser, the motorized grain spreader has only a single chute extending outwardly from a distribution plate fed by a hopper that funnels the inflow of grain onto the distribution plate. The single chute telescopes to change the effective length for the discharge point of the chute. The chute can alternatively be formed with openings in the beginning of each telescoping chute section so that the grain spreader will drop a portion of the flow of grain down the chute into an inward part of the grain storage bin while the remaining flow continues down the chute for discharge to an outward part of the grain storage bin. The motor rotates the chute about the axis of the distribution hopper to provide distribution of grain around the circumference of the grain storage bin.

The motorized grain spreader apparatus disclosed in U.S. Pat. No. 6,923,389, granted to Steve D. Shivvers on Aug. 2, 2005, includes a diverter that rotates independently with respect to the spreader pan onto which the diverter directs the flow of grain from the distribution hopper. By using separate controllable motors, the diverter can be stopped while the rotational speed of the spreader pan can be varied accordingly. The spreader pan is formed in a number of various alternative shapes, but essentially is a spiraled discharge plate with spiraled vanes that provide an intended distribution pattern to the discharged grain to the grain storage bin below. In a preferred operation, the diverter is rotated at a different rotational speed than the spreader pan to provide a continuously changing distribution pattern for the incoming grain.

One form of a gravity grain spreader is depicted in U.S. Pat. No. 8,708,632, issued on Apr. 29, 2014, to Travis Toline, et al, in which the spreading device is a domed dish having curved vanes mounted on top of the domed dish. A choking funnel is adjustably mounted below the distribution hopper receiving grain from the transport auger. The choking hopper funnels the flow of grain onto the raised vertical center of the domed dish so that the grain moves outwardly on the domed dish by gravity and engages the curved vanes mounted around the periphery of the domed dish spreader. The engagement of the downwardly moving grain with the curved vanes causes the deflection of the grain along the curved vanes, which in turn asserts a force on the vanes that cause the domed dish spreader to rotate. Ultimately, the speed of rotation will be commensurate with the speed at which the grain flows down the domed dish and result is an outward spraying of the grain into the grain storage bin.

Another gravity grain spreader is disclosed in U.S. Pat. No. 7,931,432, issued to Nelson Hershberger on Apr. 26, 2011, in which the inflow of grain is delivered to a rotating spreader pan formed with a plurality of radially oriented chutes formed with a single sidewall that extends onto the spreader pan. Each of the chute sidewalls terminate in a curved deflector blade that is engaged by the grain sliding down the chute to cause a deflection of the grain laterally relative to the longitudinal direction of the chute. This deflection asserts an opposing force on the deflector blade that causes the chute to rotate along with the spreader pan. The intended delivery of the grain is generally in a dispersed pattern toward the circumference of the grain storage bin, although the open side of the chutes opposite the sidewall, allows some grain to be dropped vertically into an interior of the grain storage bin.

One known problem with spreading grains, such as corn, that have been harvested at a high moisture rate, such as a moisture content of more than 25%, is that the grain does not slide along the chutes as well as dryer harvested grains. As a result, the distribution of the grain throughout the grain storage bin is not as uniform as might be desired. This is particularly true of static grain spreaders that have a fixed chute angle. Motorized grain spreaders can vary the rotation rate to achieve a different distribution pattern to accommodate higher moisture grains. Gravity grain spreaders do not have the motor advantage of the motorized grain spreaders and are generally not recommended for use with high moisture grains.

It would, therefore, be desirable to provide a gravity grain spreader that is simply operable and can be adjusted to accommodate even high moisture corn without affecting the uniform distribution pattern around the grain storage bin.

SUMMARY OF THE INVENTION

It is an object of this invention to overcome the disadvantages of the prior art by providing a grain spreader that is operable to distribute grain within a grain storage bin through the use of gravity.

It is another object of this invention to provide uniform distribution of grain into a grain storage bin without the need to motorize the apparatus for spreading the grain within the grain storage bin.

It is a feature of this invention that the grain spreader is powered to rotate about a vertical axis by the movement of the grain into the spreading apparatus.

It is an advantage of this invention that the distribution of the grain within the grain storage bin is uniform without requiring a motor to power the operation of the grain spreader.

It is another feature of this invention that the grains spreader apparatus includes a distribution hopper that delivers a flow of grain into a pair of opposingly oriented chutes with deflectors that cause the distribution hopper and the chutes to rotate about a vertical axis.

It is still another feature of this invention that the angle of repose of the chutes can be varied to control the rate of descent of the grain along the chutes to the deflectors.

It is another advantage of this invention that high moisture grains can be distributed through the grain spreader by increasing the angle of repose of the chutes.

It is another feature of this invention that each chute is provided with a terminal deflector at the distal end of each chute, and also with intermediate deflectors positioned in the sides of the chutes to disperse grain from each chute along the length of each chute.

It is still another advantage of this invention that the intermediate deflectors enhance the uniform distribution of the grain within the grain storage bin.

It is a further feature of this invention that the distribution hopper is formed with adjustable supports to permit mounting of the grain spreader apparatus in differently sized grain storage bins.

It is a further object of this invention to provide a gravity grain spreader apparatus that is durable in construction, inexpensive of manufacture, carefree of maintenance, facile in assemblage, and simple and effective in use.

These and other objects, features and advantages are accomplished according to the instant invention by providing a grain spreader apparatus that is powered in rotation by the flow of grain through the spreader apparatus. The gravity grain spreader includes a distribution hopper mounted at the top of a grain storage bin to receive a supply of grain to be distributed within the grain storage bin in a uniform manner. The distribution hopper delivers the grain into a pair of opposingly oriented chutes meeting at an apex underneath the distribution hopper. Each chute is provided with a terminal deflector at the end of the chute, and with intermediate deflectors built into the sides of the chutes to provide a more uniform dispersal of the grain into the grain storage bin. The angle of repose of the chutes is variable through an adjustment mechanism so that higher moisture grains can be fed through the grains spreader apparatus and effectively distributed.

BRIEF DESCRIPTION OF THE DRAWINGS

The foregoing and other objects, features, and advantages of the invention will appear more fully hereinafter from a consideration of the detailed description that follows, in conjunction with the accompanying sheets of drawings. It is to be expressly understood, however, that the drawings are for illustrative purposes and are not to be construed as defining the limits of the invention.

FIG. 5 is an enlarged perspective view of the chute shown in FIG. 4 with the lower end of the opposing chute being shown in the background.

DETAILED DESCRIPTION OF THE PREFERRED EMBODIMENT

Figure 1:
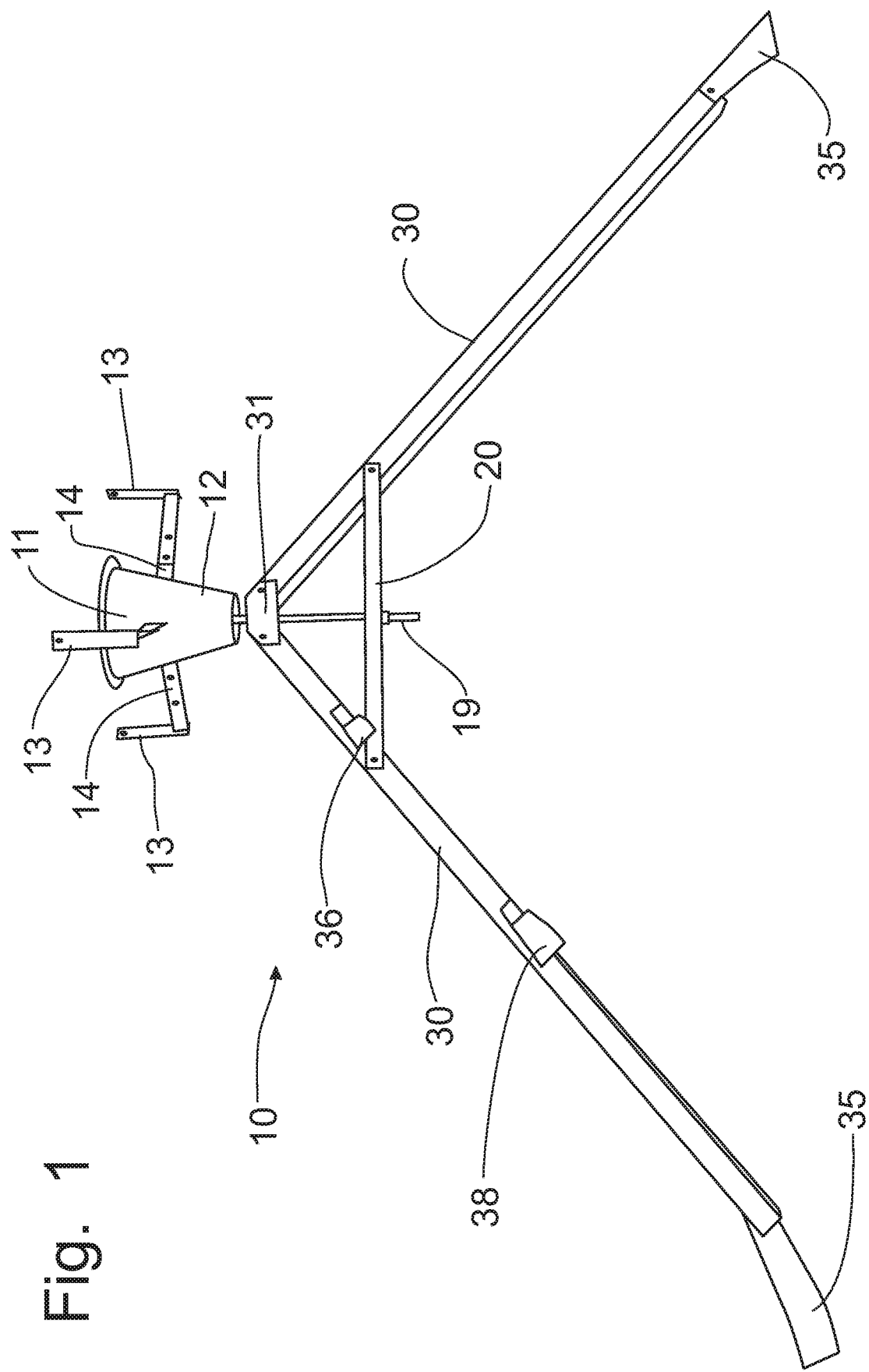
FIG. 1 is an elevational view of the gravity grain spreader incorporating the principles of the instant invention.

Referring to the drawings, a gravity grain spreader incorporating the principles of the instant invention can best be seen. The uppermost portion of the gravity grain spreader 10 is the distribution hopper 11 that is formed with mounting brackets 13 detachably connected to support arms 14 to permit fastening the distribution hopper 11 in the top part of a grain storage bin (not shown). The detachable connection between the mounting brackets 13 and the support arms 14 enables the length of the support arm 14 to be adjusted to accommodate various sizes of grain storage bins. Preferably, three mounting brackets 13 are provided to provide a stable connection to the top of the interior of the grain storage bin. The distribution hopper 11 rests on the support arms 14 which pass through the walls 12 of the distribution hopper 11, as is best seen in FIGS. 2 and 3.

Figure 3:
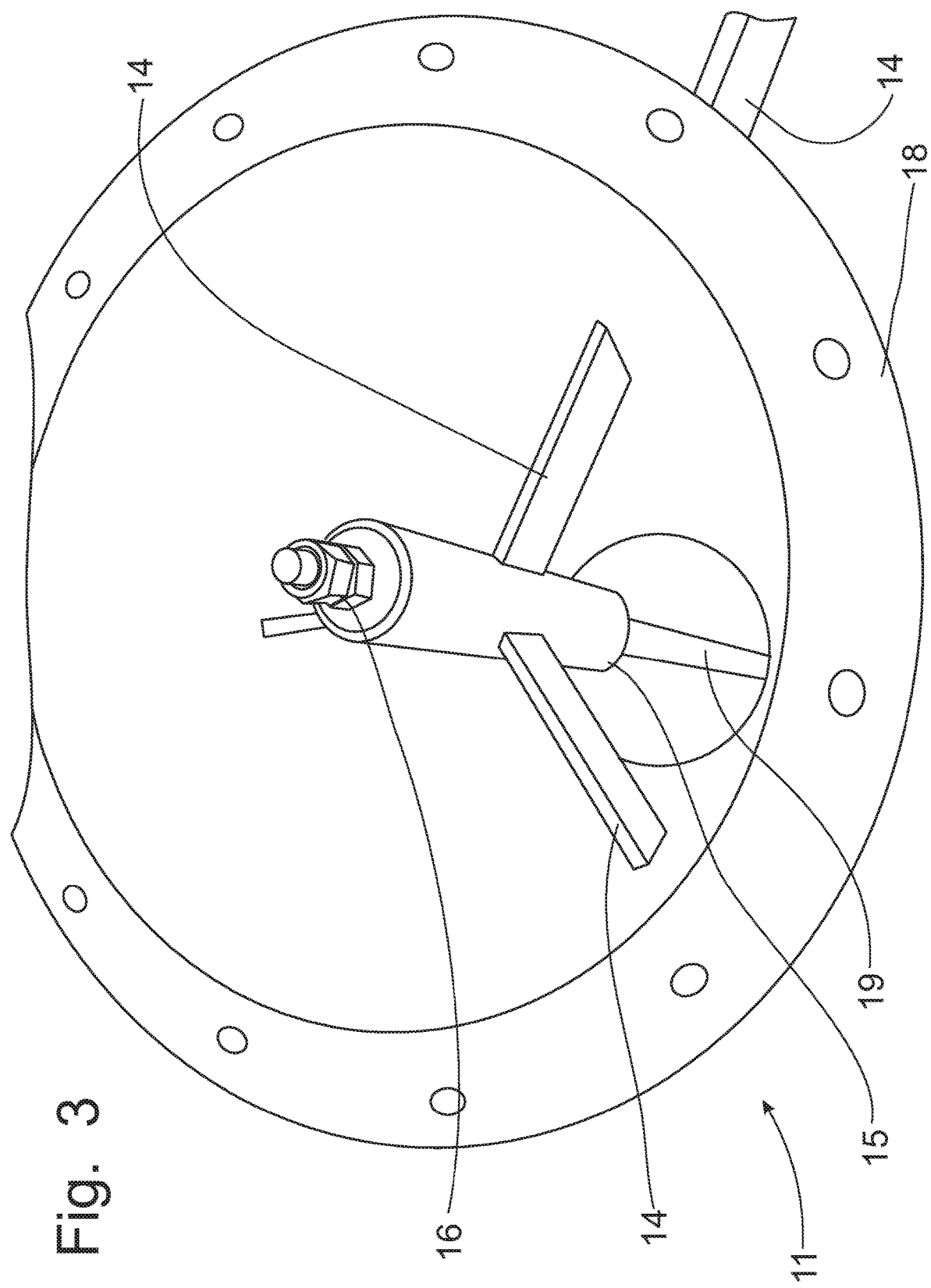
FIG. 3 is an enlarged perspective view of the interior of the distribution hopper.

Looking at the perspective view of the interior of the distribution hopper 11 depicted in FIG. 3, one skilled in the art can see that the support arms 14 pass through the walls 12 of the distribution hopper 11 and connect to a bearing housing 15. Preferably, the bearing housing 15 receives a vertical shaft 19 that is rotatably supported within the bearing housing 15 by sets of opposing tapered roller bearings (not shown) that compress against the shaft 19 by the compression nut 16 at the top of the bearing housing 15 to provide satisfactory rotational support for the shaft 19. The walls 12 are frusto-conical in shape terminating at a central discharge opening at the bottom of the distribution hopper 11 that is smaller in diameter than the infeed opening at the top of the distribution hopper 11 in order to funnel the flow of grain through the distribution hopper 11.

Figure 2:
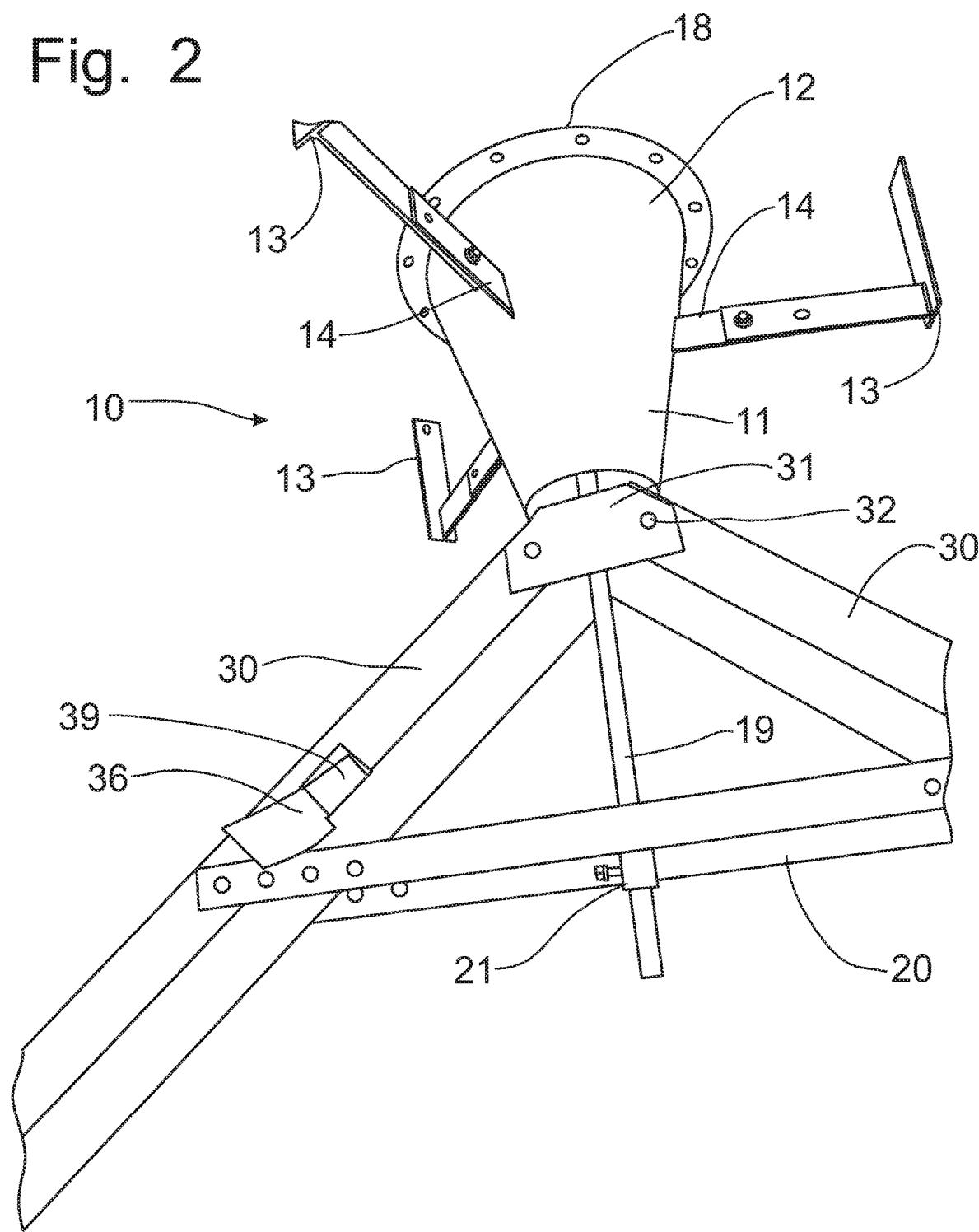
FIG. 2 is a lower perspective view of the upper portion of the gravity grain spreader shown in FIG. 1.

As shown in FIGS. 1-3, the vertical shaft 19 projects downwardly through the discharge opening at the bottom of the distribution hopper 11 and is connected to a horizontal frame member 20 spaced below the distribution hopper 11. The frame member 20 is supported on the shaft 19 by at least one nut 21, preferably a lock nut, which couples the frame member 20 to the shaft 19 so that the frame member 20 rotates with the shaft 19. The distance between the bottom of the distribution hopper 11 and the frame member 20 can be selectively adjusted by repositioning the at least one lock nut 21 along the length of the shaft 19, as will be described in greater detail below.

A pair of opposing chutes 30 are connected to the opposing respective ends of the frame member 20 by fasteners, and then connected together at an apex by a connection bracket 31 that provides a pivot bolt 32 for the pivotal connection of each of the chutes 30 to the connection bracket 31. By moving the frame member 20 vertically along the shaft 19, the angle of repose of the two chutes 30 can be varied within a finite range of about 35-45 degrees. Alternatively, or in addition to the vertical movement of the frame member 20 along the shaft 19, the connection between the opposing lateral ends of the frame member 20 and the respective chutes 30 can be positionally adjusted by repositioning the fasteners along holes in the sidewalls of the chutes 30 or along holes formed in the frame member 20, thus causing the chutes 30 to pivot about the respective pivot bolts 32. Accordingly, the angle of repose of the chutes 30 can be adjusted to accommodate the desired movement of the grain irrespective of the moisture content at which the grain was harvested.

Figure 4:
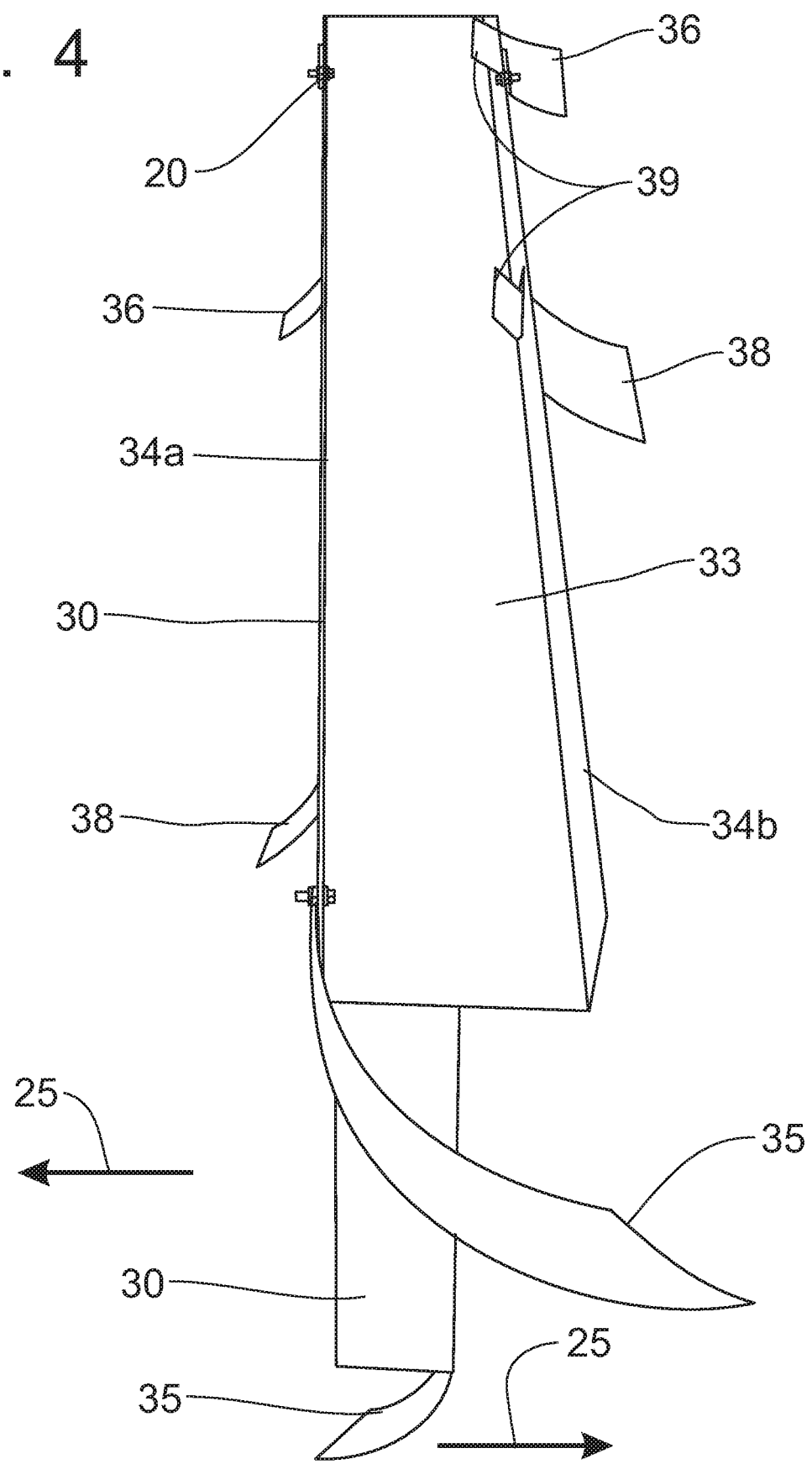
FIG. 4 is a perspective view of one of the chutes having a curved deflector at the end thereof, the back side of the opposing chute being shown behind the front chute.

Referring now to FIG. 4, the configuration of the chutes 30 can best be seen. The opposing chutes 30 are formed and configured substantially identically, although the specific locations of the intermediate deflectors 36, 38 are preferably offset to provide a more uniform distribution of the grain. Each chute 30 has a floor member 33 and opposing upright sidewalls 34*a*, 34*b*. The end of each of the chutes 30 includes a detachable deflector 35 connected to one of the sidewalls 34*a*. Each deflector 35 is both curved and rolled to provide a spiral flow path for distribution of the grain falling from the end of the chute 30. In addition, each chute 30 is also provided with first and second intermediate deflectors 36, 38 to provide enhanced distribution of grain from the spinning chutes 30 while operating as described in greater detail below. Preferably, the location of the intermediate deflectors 36, 38 with respect to the opposing chutes 30 is preferably offset by approximately eighteen inches to enhance the distribution pattern from the chutes 30.

Each of the intermediate deflectors 36, 38 is mounted on the sidewall 34*b* opposite the sidewall 34*a* on which the deflector 35 is mounted. Each intermediate deflector 36, 38 is associated with a formed opening in the corresponding sidewall 34*b* such that an interior portion 39 of the intermediate deflector 36, 39 projects through the opening into the flow path of the chute 30. With the rotational movement of the chute 30 being toward the deflector 35 mounted sidewall 34*a*, the grain moving along the chute 30 is urged toward the opposing sidewall 34*b* and into engagement with the interior portion 39 of the intermediate deflectors 36, 38. As a result, the interior portion 39 of the intermediate deflectors 36, 38 direct some of the grain flow through the corresponding opening and into engagement with the curved intermediate deflectors 36, 38, respectively. The grain engaging the intermediate deflectors 36, 38 disperses in a spray toward portions of the grain storage bin (not shown) proximate the center thereof. The upper intermediate deflector 36 is preferably shorter than the lower intermediate deflector 38 so that the dispersal of the grain is less emphatic, allowing collection of the grain toward the center of the grain storage tank, as opposed to the lower intermediate deflector 38 that directs grain into a middle portion of the grain storage bin.

The impact of the grain onto the deflectors 35 urges the chutes in the opposing direction as represented by the arrows 25. With the chutes 30 being suspended on the shaft 19, which is turn is supported by tapered roller bearings, the chutes 30 will rotate with ease, causing a dispersal of the grain from the deflectors 35, and also from each of the intermediate deflectors 36, 38 to fall into a uniform distribution within the grain storage bin. The angle of repose of the opposing chutes 30 can be adjusted as needed by repositioning the chutes 30 on the frame member 20, or by vertically moving the frame member 20 along the shaft 19, to accommodate higher or lower moisture content of the harvested grain.

In operation, the distribution hopper 11 is mounted to the top of the grain storage bin (not shown) by connecting the mounting brackets 13 to the structure of the grain storage bin. The adjustability of the support arms 14 enable the distribution hopper 11 to be mounted into different sizes of grain storage bin with the distribution hopper 11 centered under the access opening (not shown) at the top of the grain storage bin through which a transport auger delivers harvested grain. Typically, the distribution hopper 11 is mounted without the chutes 30 being connected thereto, therefore, the next step would be to mount the chutes 30 to the distribution hopper 11. The chutes 30 are then mounted to the opposing ends of the frame member 20 and to the connection bracket 31 at the apex of the connected chutes 30, which is centered beneath the discharge opening at the bottom of the distribution hopper 11. The angle of repose for the chutes 30 is selected and attained by varying the mounting connection between the opposing ends of the frame member 20 and the sidewalls 34*a*, 34*b* of the chutes 30, or by raising or lowering the frame member 20 along the length of the shaft 19. The lower the frame member 20 is located along the shaft 19, the steeper the angle of repose will be for the chutes 30.

If the intermediate deflectors 36, 38 are not installed on the chutes 30, then that action has to be accomplished before operation of the gravity grain spreader 10. Likewise, the primary or terminal deflector 35 needs to be mounted on the end of the chute 30 as depicted in FIGS. 4 and 5. Typically, the chutes are approximately seven inches wide and about eight feet long. For grain storage bins that have a diameter wider than about 20 feet, the chutes 30 are adapted for connection of an extension (not shown) that mounts on the end of the chute 30. The extensions are typically four feet long and for even larger diameter grain storage bins, more than one extension may be required to obtain proper uniform dispersion of the grain. Preferably, each extension can have an intermediate deflector, preferably formed and mounted near the connection of the extension with the primary chute 30. Once properly mounted and assembled, the gravity grain spreader 10 is ready to operate.

Grain is delivered by a transport auger from externally of the grain storage bin and discharged at the access opening in the top of the grain storage bin. The discharged grain is received within the distribution hopper 11 which funnels the grain down through the discharge opening at the bottom of the distribution hopper 11 and onto the apex of the chutes 30 position immediately below the distribution hopper 11. The grain then slides down the opposing chutes 30. Some of the grain will engage the interior portions 39 of the intermediate deflectors 36, 38 on both chutes 30 and pass through the corresponding opening in the sidewall 34b and onto the intermediate deflector 36, 38. The resultant deflection of the grain by the intermediate deflectors 36, 38 start the rotation of the chutes 30. When the majority of the flow of grain reaches the primary deflector 35, rotational speed increases and the primary and intermediate deflectors 35, 36, 38 affect a sprayed dispersal of the grain to provide a uniform distribution of the grain over the interior surface of the grain storage bin. With this sprayed dispersal of the grain from the deflectors 35, 36, 38, the fines in the grain do not accumulate at any position within the grain storage bin. As a result, the grain is dried more uniformly and quickly as the air blows uniformly through the stored grain.

As can be seen in FIG. 3, the top rim of the distribution hopper is provided with a mounting ring 18 having a plurality of holes formed therein around the circumference of the mounting ring 18. This mounting ring 18 can be provided to permit a mounting of optional structural elements to the distribution hopper 11. For example, a chimney (not shown) can be mounted on the top of the distribution hopper 11 to control the flow of air within the grain storage tank or to direct grain from the transport auger into the distribution hopper 11.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A grain spreader supported within a storage facility to distribute grain delivered thereto by a transport apparatus, comprising:

a distribution hopper for support within said storage facility to receive grain delivered by said transport apparatus;

a vertical shaft supported for rotation relative to said distribution hopper, by a bearing housing having bearings supported therein rotatably engaged with said shaft, said bearing housing being supported by said distribution hopper;

a frame member connected to said shaft for rotation therewith, said frame member having laterally opposing ends;

a pair of chutes connected respectively to said frame member on the laterally opposing ends of said frame member for rotation therewith, each said chute having a floor member and first and second upright sidewalls, each said chute further having a primary curved deflector connected to said first sidewall to disperse grain engaging therewith, said chutes being connected together into an apex above said frame member, the movement of said grain along said primary deflectors urging said chutes and said frame member for rotational movement with said vertical shaft; and wherein each said chute is formed with at least one opening in the second sidewall opposite the first sidewall mounting said primary deflector, the grain spreader further comprising:

an intermediate deflector mounted to said second sidewall and including an interior portion projected through said at least one opening into engagement with grain moving over said floor member to divert grain through said at least one opening and onto an exterior portion of said intermediate deflector for dispersion therefrom.

2. The grain spreader of claim 1 wherein said chutes are mounted at said apex to a connection bracket carrying a pivot bolt for the pivotal movement of said chutes relative to said connection bracket.

3. The grain spreader of claim 2 wherein said frame member is adjustably positionable along said vertical shaft to vary an angle of repose of said chutes connected thereto.

4. The grain spreader of claim 2 wherein said chutes are adjustably positionable relative to said frame member to vary an angle of repose of said chutes.

5. A gravity grain spreader supported within a storage facility to distribute grain delivered thereto by a transport apparatus, comprising:

a distribution hopper for support within said storage facility to receive grain delivered by said transport apparatus;

a vertical shaft supported for rotation relative to said distribution hopper;

a frame member connected to said shaft for rotation therewith, said frame member having laterally opposing ends;

a pair of chutes connected to said frame member for rotation therewith, each said chute having a floor member and first and second upright sidewalls on laterally opposing sides of said floor member;

a primary deflector connected to said first sidewall of each said chute to disperse grain engaging therewith, said chutes being connected together into an apex above said frame member; and each said chute is formed with at least one opening in said second sidewall, at least one intermediate deflector mounted to said second sidewall and including an interior portion projected through the corresponding said opening into engagement with grain moving over said floor member to divert grain through said corresponding opening and onto an exterior portion of said intermediate deflector for dispersion therefrom.

6. The gravity grain spreader of claim 5 wherein said vertical shaft is supported for rotation from a bearing housing having bearings supported therein rotatably engaged with said shaft, said bearing housing being supported by said distribution hopper.

7. The gravity grain spreader of claim 5 wherein said chutes are mounted at said apex to a connection bracket carrying a pivot bolt for the pivotal movement of said chutes relative to said connection bracket.

8. The gravity grain spreader of claim 7 wherein said frame member is adjustably positionable along said vertical shaft to vary an angle of repose of said chutes connected thereto.

9. The gravity grain spreader of claim 7 wherein said chutes are adjustably positionable relative to said frame member to vary an angle of repose of said chutes.

10. The gravity grain spreader of claim 7 wherein said distribution hopper includes a plurality of mounting brackets with each said mounting bracket including an adjustable support arm operable to position the corresponding said mounting bracket at a selected distance from said distribution hopper.

11. A gravity grain spreader supported within a storage facility to distribute grain delivered thereto by a transport apparatus, comprising:
- a distribution hopper for support within said storage facility to receive grain delivered by said transport apparatus;
- a vertical shaft supported for rotation relative to said distribution hopper;
- a frame member connected to said shaft for rotation therewith, said frame member having laterally opposing ends;
- a pair of chutes connected to said frame member for rotation therewith, each said chute having a floor member and first and second upright sidewalls on laterally opposing sides of said floor member, said chutes being mounted at an uppermost end thereof to a connection bracket carrying a pivot bolt for the pivotal movement of said chutes relative to said connection bracket, said frame member being adjustably positionable along said vertical shaft to vary an angle of repose of said chutes connected thereto; and
- a primary deflector connected to said first sidewall of each said chute to disperse grain engaging therewith, said chutes being connected together into an apex above said frame member, each said chute being formed with at least one opening in said second sidewall, at least one intermediate deflector being mounted to said second sidewall and including an interior portion projected through the corresponding said at least one opening into engagement with grain moving over said floor member to divert grain through the corresponding said at least one opening and onto an exterior portion of said intermediate deflector for dispersal therefrom.

12. The gravity grain spreader of claim 11 wherein said chutes are adjustably positionable relative to said frame member to vary an angle of repose of said chutes.

13. The gravity grain spreader of claim 11 wherein said vertical shaft is supported for rotation from a bearing housing having bearings supported therein rotatably engaged with said shaft, said bearing housing being supported by said distribution hopper.

14. The gravity grain spreader of claim 11 wherein said distribution hopper includes a plurality of mounting brackets with each said mounting bracket including an adjustable support arm operable to position the corresponding said mounting bracket at a selected distance from said distribution hopper.

* * * * *